2 Sheets—Sheet 1.

S. RITTY.
Horse Hay-Rake.

No. 202,871. Patented April 23, 1878.

Witnesses:
Will H. Dodge
Donn P. Twitchell

Inventor:
Sebastian Ritty
By his atty.
Dodge &n

N. PETERS, PHOTO-LITHOGRAPHER, WASHINGTON, D. C.

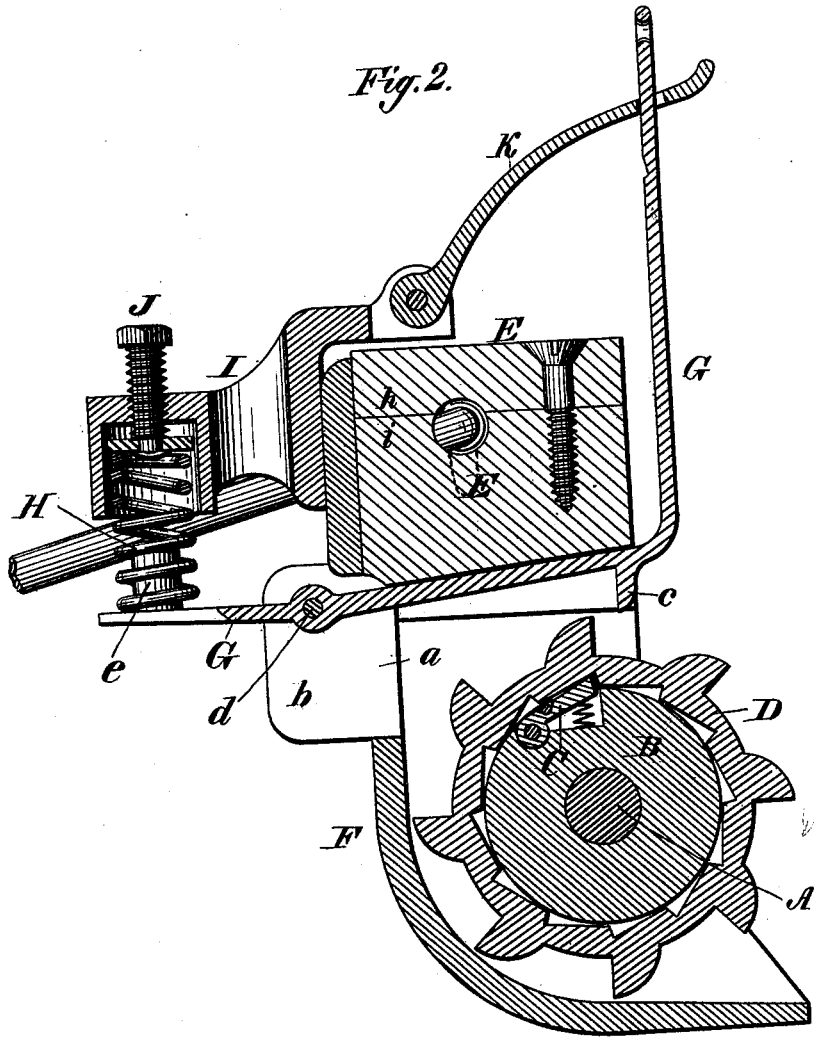

UNITED STATES PATENT OFFICE.

SEBASTIAN RITTY, OF DAYTON, OHIO, ASSIGNOR OF ONE-HALF HIS RIGHT TO JOHN DODDS, OF SAME PLACE.

IMPROVEMENT IN HORSE HAY-RAKES.

Specification forming part of Letters Patent No. 202,871, dated April 23, 1878; application filed September 7, 1877.

*To all whom it may concern:*

Be it known that I, SEBASTIAN RITTY, of Dayton, in the county of Montgomery and State of Ohio, have invented certain new and useful Improvements in Horse Hay-Rakes, of which the following is a specification:

This invention relates to that class of wheeled horse-rakes in which a rocking rake-head having teeth attached thereto is moved to effect the dumping of the hay through the medium of a ratchet-wheel mounted upon the axle, and a catch pivoted upon the rake-head, to engage with said wheel.

The improvements consist in the peculiar construction of a metal head-piece or block adapted to serve the several purposes of a bearing for the axle, a guard or shield for the ratchet-wheel, and a support for the catch, its locking device, and its operating-spring; in the special form and arrangement of the parts whereby I am enabled to use a small ratchet-wheel, and locate the same directly under the rake-head, without severing or weakening the latter, as usual; and in the use of thimbles to support and hold the ends of the rake-teeth mounted between the two parts of a longitudinally-divided rake-head, as hereinafter described.

Figure 1:
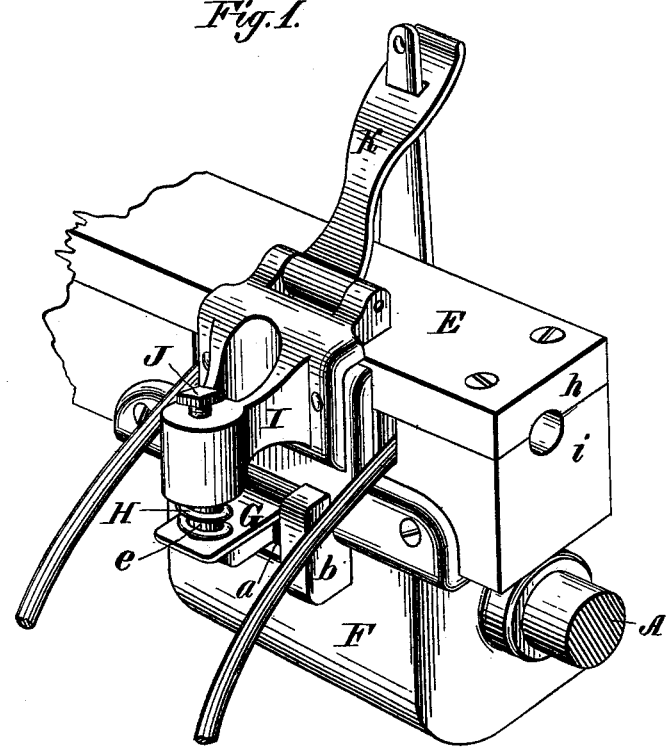
Figure 3:
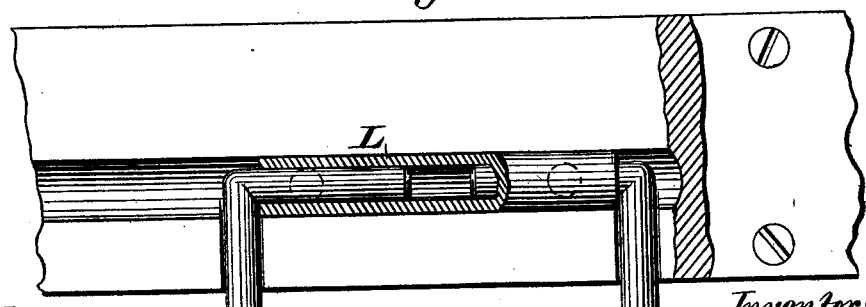

Figure 1 represents a perspective view of the middle portion of the rake-head and axle with my improvements applied; Fig. 2, a vertical central cross-section of the same; Fig. 3, a plan view of the rake-head, with the upper portion broken away to expose the ends of the rake-teeth and their thimble, which latter is shown in section at one end.

In the drawing, A represents the main axle or shaft, divided at its center, and provided on its adjacent ends with two disks, B, carrying peripheral pawls C, and inclosed by a ratchet-wheel, D, which is provided with internal teeth to receive the dogs, and with external teeth to engage with a catch, hereinafter described.

The above arrangement of parts, by which the ratchet-wheel is turned forward by either or both ends of the axle, is substantially the same as in the patent granted to Hoffheim, June 13, 1876, No. 178,775, and forms no part of my invention.

E represents a rocking rake-head, mounted above and supported from the axle by suitable bearings at the ends, in any ordinary manner. F represents my improved head-block, having flanges, by which it is bolted to the under and rear sides of the rake-head, whence it extends downward past the two sides of the ratchet-wheel, and also behind and under the same, as shown in Figs. 1 and 2.

It will be seen that the head thus forms a guard or shield to inclose and protect the wheel, and also a bearing to support the inner ends of the divided shaft or axle, and hold them in line with each other. The form of the parts is such that the ratchet-wheel, which is of comparatively small size, is sustained immediately and closely under a rake-head.

Through the rear side of the head F there is formed an opening, $a$, having rearwardly-projecting lips $b$ at its sides. Through this opening, and beneath the rake-head, there extends a catch or lever, G, having its front end turned upward in front of the rake-head, and having near its front end a depending tooth, $c$, to engage with the ratchet-wheel, as clearly shown in Fig. 2. The catch is mounted, as shown, upon a pivot, $d$, passing through the ears or flanges $b$ on the rear side of the head-block. The catch extends backward in rear of its pivot, and is provided with an upright stud, $e$, which receives the lower end of a spiral spring, H, which serves to hold the forward end of the catch in an elevated position, and out of contact with the ratchet-wheel, except when fastened down, as hereinafter described. The upper end of the spring H is mounted in a cavity in the arm I, extending backward from the upper part of the head-block F. In the drawing this arm is represented as being riveted to the head-block; but in practice it will be cast rigidly upon and form an integral part of said block. For the purpose of regulating the force of the spring, a screw, J, is inserted through the top of the arm I, and provided at its lower end with a plate or washer bearing upon the spring, as shown in Figs. 1 and 2. When the catch G has its forward end depressed it engages with the ratchet-wheel, which causes the rake-head to tip forward, so as to elevate the rake-teeth and discharge the hay. For the purpose of holding the catch in contact with the ratchet-wheel, a pivoted latch, K, is employed, as shown in Figs. 1 and 2, the catch being provided with an opening in its forward end to admit the latch, and being pivoted at its lower end to an ear on the arm I, as shown in Figs. 1 and 2. A chain, rod, or other proper device will be connected with the catch G, and extended within reach of the operator for the purpose of depressing the latch when required, and suitable devices will also be provided to cause the disengagement of the catch or dog K from the latch when the rake-teeth have attained the proper elevation.

By constructing the head F in the manner shown and described, it is made to serve as a support for all the parts used in connection with the ratchet-wheel. By pivoting the catch G at a point in the rear of and immediately under the rake-head, and passing forward between the rake-head and the ratchet-wheel, I am enabled to bring the various parts together in an exceedingly compact and durable form.

My construction admits of the use of a ratchet-wheel of smaller size than usual, and of its being brought directly under and in close proximity to the rake-head, and this without either cutting said head in two or using the various separate bearings and long connections between the parts used in other rakes of this class.

For the purpose of holding the rake-teeth, which have their forward ends bent at right angles to serve as pivots, I employ metallic tubular sleeves L, as shown in Fig. 3, mounting the same in the rake-head, which is divided longitudinally into two parts, h and i, between which the sleeves are introduced. The inner faces of the two parts h i are suitably grooved to admit the sleeves when the parts are drawn together by fastening bolts or screws, as shown. Slots or openings are cut through the rear side of the rake-head from the sleeves downward, as shown in Fig. 1, to receive the bodies of the teeth. Each sleeve receives the ends of two teeth, the teeth being inserted from opposite directions, and then the sleeve inserted between the parts of the rake-head and secured by fastening the latter together.

In order to prevent the sleeves from moving endwise or working loose, they may be provided, as shown in dotted lines in Fig. 2, with studs or ears, to be seated in the rake-head, as shown.

Disclaiming the broad idea of a divided axle and ratchet-wheel, as shown, and the combination of a ratchet-wheel with a latch on the rake-head, and also the broad idea of a shield to cover the wheel,

What I claim is—

1. The cast-metal head F, constructed in the form shown and described, adapted to support the axle, catch G, latch K, and spring H.

2. The metal head F, inclosing the ratchet-wheel and sustaining the ends of the divided axle, in combination with the rake-head secured thereto, and the catch G, extending between the head and wheel, and pivoted in the head, as shown.

3. The spring H, in combination with the catch G, arm I, and screw J, arranged in the manner and for the purpose described.

4. The sleeves or thimbles K, arranged within the divided rake-head to receive and hold the rake-teeth.

SEBASTIAN RITTY.

Witnesses:
B. PICKERING,
J. J. BELVILLE.